US008606954B1

(12) United States Patent
Abidogun et al.

(10) Patent No.: US 8,606,954 B1
(45) Date of Patent: Dec. 10, 2013

(54) PROGRESSIVE DOWNLOAD OF MEDIA CONTENT OVER DIFFERENT WIRELESS ACCESS NETWORKS

(75) Inventors: Ayodeji Abidogun, Overland Park, KS (US); Jagannath Ghoshal, Overland Park, KS (US); Steven Hashik Kim, Olathe, KS (US); Badri Prasad Subramanyan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 217 days.

(21) Appl. No.: 13/071,031

(22) Filed: Mar. 24, 2011

(51) Int. Cl.
*G06F 15/16* (2006.01)
*G06F 9/445* (2006.01)

(52) U.S. Cl.
USPC .......................................... 709/231; 717/178

(58) Field of Classification Search
USPC .................. 717/173, 177–178; 709/217–219, 709/231–233
See application file for complete search history.

(56) References Cited

U.S. PATENT DOCUMENTS

| | | | |
|---|---|---|---|
| 6,477,522 B1 * | 11/2002 | Young | 1/1 |
| 7,043,548 B2 * | 5/2006 | Bouet | 709/224 |
| 7,559,089 B2 * | 7/2009 | Kroll et al. | 726/26 |
| 7,620,015 B2 | 11/2009 | Lenzarini | |
| 7,802,006 B2 | 9/2010 | Bowra et al. | |
| 2005/0076214 A1 | 4/2005 | Thomas et al. | |
| 2006/0168227 A1 | 7/2006 | Levine et al. | |
| 2007/0130210 A1 | 6/2007 | Park | |
| 2007/0136679 A1 * | 6/2007 | Yang | 715/772 |
| 2007/0165572 A1 | 7/2007 | Lenzarini | |
| 2009/0176482 A1 * | 7/2009 | Martin et al. | 455/414.3 |
| 2009/0268655 A1 | 10/2009 | Bertz et al. | |
| 2009/0300202 A1 | 12/2009 | Hogan et al. | |
| 2010/0083303 A1 | 4/2010 | Redei et al. | |
| 2010/0094931 A1 | 4/2010 | Hosur et al. | |
| 2010/0121972 A1 | 5/2010 | Samuels et al. | |

* cited by examiner

*Primary Examiner* — Chirag R Patel (57) ABSTRACT

A wireless communication device comprises a processing system and a communication transceiver. The communication transceiver is configured to receive a first portion of a media file transmitted from a media gateway over a first wireless network via progressive download, and perform a handoff to a second wireless network. The processing system is configured to determine a content received ratio of the media file that indicates the first portion of the media file received by the wireless communication device, and generate a request for a second portion of the media file. The communication transceiver is configured to transfer the request for the second portion of the media file for delivery to the media gateway over the second wireless network, wherein the request for the second portion of the media file includes the content received ratio, and receive the second portion of the media file transmitted from the media gateway over the second wireless network via progressive download.

20 Claims, 7 Drawing Sheets

PROGRESSIVE DOWNLOAD OF MEDIA CONTENT OVER DIFFERENT WIRELESS ACCESS NETWORKS

TECHNICAL BACKGROUND

Many individuals are increasingly utilizing wireless communication devices to receive media content from media servers over wireless networks. For example, a user of a wireless communication device may request audio, video, text, and other data from a content provider. When the user of the wireless communication device requests content from the content provider, the requested media is typically transferred from the content provider to the communication device via the wireless network for the use or enjoyment of the user.

The bandwidth of a wireless network can vary depending on the type of network. Therefore, media content received over one type of wireless network, such as a third generation (3G) wireless network, can be in a different format, quality, and file size than the corresponding content accessible over a different type of network, such as a fourth generation (4G) wireless network. For example, a wireless communication device may receive a standard definition video file when connected to the 3G wireless network, but receive the same content in a larger, high definition video file when connected to the 4G wireless network.

Progressive download is one technique used to deliver media content to a wireless communication device. Using progressive download, a wireless communication device stores the media file on a memory system of the device as it is received, and begins to display or play back the media file prior to the download fully completing. Progressive download differs from streaming content in that the entire file is downloaded locally, as opposed to only a small amount of the file at any given time that is stored in a temporary playback buffer when streaming.

OVERVIEW

A method of operating a wireless communication device to facilitate progressive download of media content comprises receiving a first portion of a media file transmitted from a media gateway over a first wireless network via progressive download and performing a handoff to a second wireless network. The method further comprises determining a content received ratio of the media file that indicates the first portion of the media file received by the wireless communication device. The method further comprises transferring a request for a second portion of the media file for delivery to the media gateway over the second wireless network, wherein the request for the second portion of the media file includes the content received ratio of the media file. The method further comprises receiving the second portion of the media file transmitted from the media gateway over the second wireless network via progressive download.

A wireless communication device comprises a processing system and a wireless communication transceiver. The wireless communication transceiver is configured to receive a first portion of a media file transmitted from a media gateway over a first wireless network via progressive download, and perform a handoff to a second wireless network. The processing system is configured to determine a content received ratio of the media file that indicates the first portion of the media file received by the wireless communication device, and generate a request for a second portion of the media file. The wireless communication transceiver is further configured to transfer the request for the second portion of the media file for delivery to the media gateway over the second wireless network, wherein the request for the second portion of the media file includes the content received ratio of the media file, and receive the second portion of the media file transmitted from the media gateway over the second wireless network via progressive download.

A communication system to facilitate progressive download of media content comprises a wireless communication device and a media gateway. The wireless communication device is configured to receive a first portion of a media file transmitted from a media gateway over a first wireless network via progressive download, perform a handoff to a second wireless network, determine a content received ratio of the media file that indicates the first portion of the media file received by the wireless communication device, and transfer a request for a second portion of the media file for delivery to the media gateway over the second wireless network, wherein the request for the second portion of the media file includes the content received ratio of the media file. The media gateway is configured to determine the second portion of the media file based on the content received ratio of the media file included in the request for the second portion of the media file, and transfer the second portion of the media file for delivery to the wireless communication device. The wireless communication device is configured to receive the second portion of the media file transmitted from the media gateway over the second wireless network via progressive download.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
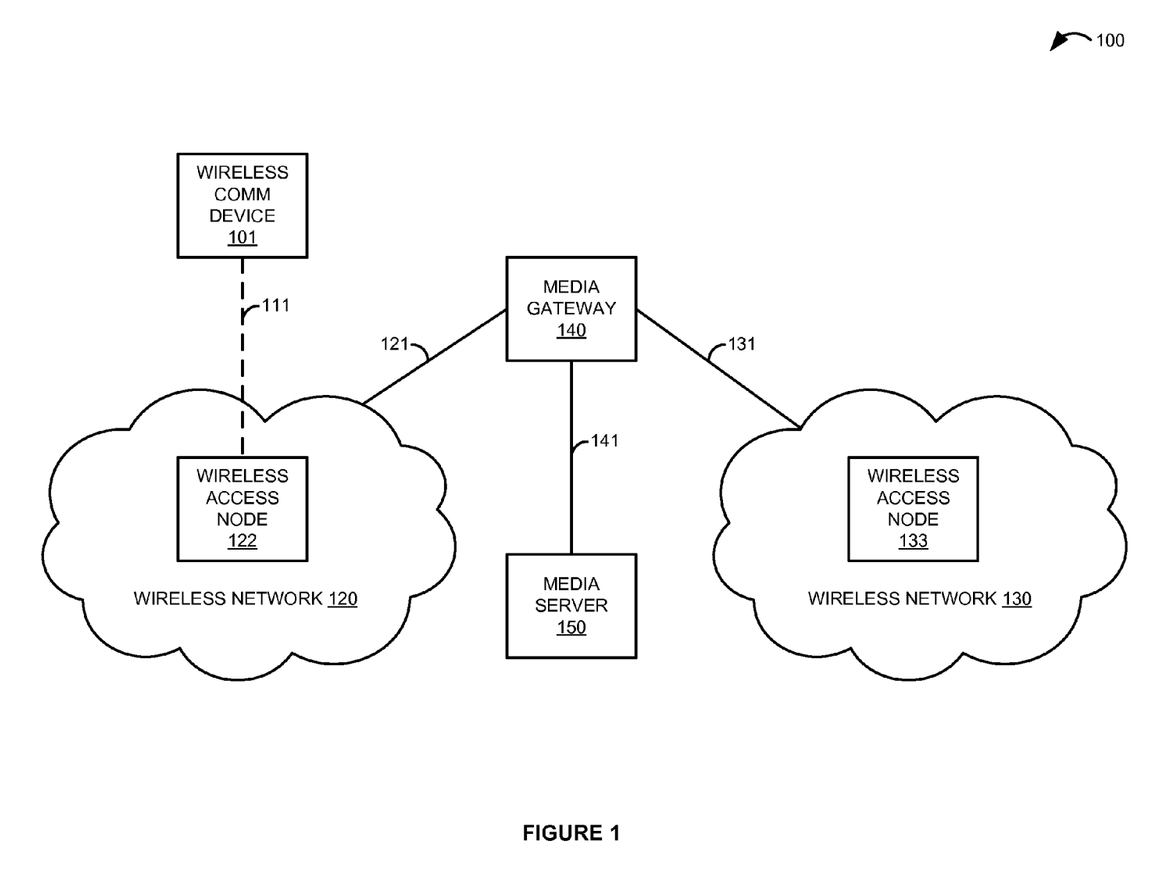
FIG. 1 is a block diagram that illustrates a communication system.

FIG. 1 is a block diagram that illustrates communication system 100. Communication system 100 includes wireless communication device 101, wireless communication networks 120 and 130, media gateway 140, and media server 150. Wireless network 120 includes wireless access node 122, and wireless network 130 includes wireless access node 133. Wireless communication device 101 and wireless access node 122 are in communication over wireless communication link 111. Although not shown in FIG. 1, wireless communication device 101 and wireless access node 133 could communicate over a similar wireless communication link. Wireless access node 122 and media gateway 140 communicate over communication link 121, while wireless access node 133 and media gateway 140 communicate over communication link 131. Media gateway 140 and media server 150 are in communication over communication link 141.

Figure 2:
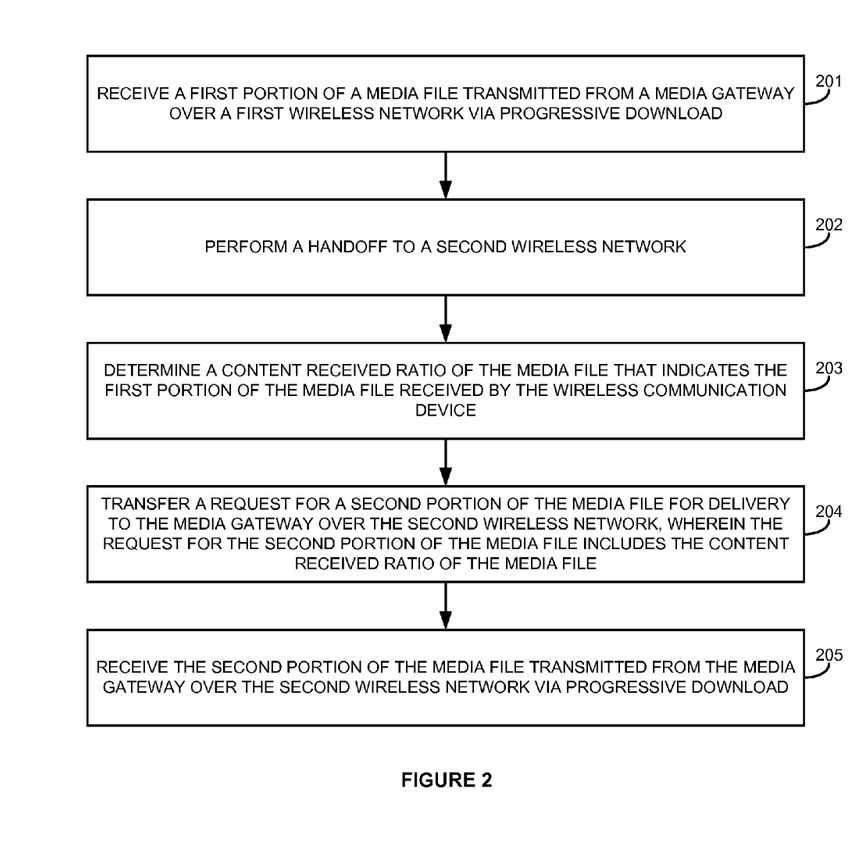
FIG. 2 is a flow diagram that illustrates an operation of the communication system.

FIG. 2 is a flow diagram that illustrates an operation of communication system 100. The steps of the operation are indicated below parenthetically. In particular, the operation of FIG. 2 shows a method of operating wireless communication device 101 within communication system 100 to facilitate progressive download of media content.

In FIG. 2, wireless communication device 101 receives a first portion of a media file transmitted from media gateway 140 over a first wireless network 120 via progressive download (201). Wireless communication device 101 typically receives the first portion of the media file responsive to a request initiated by device 101 for the media content. The media file could comprise any digital media content, such as images, video, audio, text, animation, interactive media, or any other multimedia files. In some examples, the media file could comprise a portion of a web site, an applet, or some other application. Typically, wireless communication device 101 receives the media file via progressive download by storing the media file on a memory system of device 101 as the file is received, and begins to display or play back the media file on device 101 prior to the download fully completing.

Once wireless communication device 101 receives the first portion of the media file transmitted from media gateway 140 over the first wireless network 120, wireless communication device 101 performs a handoff to a second wireless network 130. To perform the handoff, wireless communication device 101 typically establishes a wireless communication link with wireless access node 133 of the second wireless network 130 and communicates with wireless access node 133 to initiate a communication session over the second wireless network 130. In some examples, wireless communication device 101 performs the handoff to the second wireless network 130 by performing a hard handoff to the second wireless network 130. A hard handoff occurs when wireless communication device 101 terminates the connection to the first wireless network 120 prior to establishing a connection to the second wireless network 130 via wireless access node 133.

Wireless communication device 101 also determines a content received ratio of the media file that indicates the first portion of the media file received by wireless communication device 101 (203). Wireless communication device 101 could utilize a number of techniques to determine the content received ratio of the media file. For example, wireless communication device 101 could determine the content received ratio of the media file by determining a byte ratio of received bytes to total bytes of the media file. The byte ratio would therefore indicate the first portion of the media file received by wireless communication device 101 as a percentage of the total media file that has already been received by device 101. In other examples, wireless communication device 101 could determine the content received ratio of the media file by determining a remaining bytes ratio of remaining bytes to total bytes of the media file. In this case, the remaining bytes ratio would indicate a percentage of the total media file that remains to be received by device 101 in order to complete the progressive download of the media file. In some examples, wireless communication device 101 could also determine the remaining bytes ratio by subtracting the byte ratio of received bytes to total bytes from the number one.

In other examples, wireless communication device 101 could additionally or alternatively determine the content received ratio of the media file based on time. For example, wireless communication device 101 could determine the content received ratio of the media file by determining a time ratio of played time to total time of the media file. The played time could comprise the length of time of the first portion of the media file received by device 101, or the amount of the media file that has been played back on a media player of device 101 in time units, such as minutes and/or seconds. For example, wireless communication device 101 could determine the played time and the total time from a media player configured to play the media file on wireless communication device 101. In some examples, wireless communication device 101 could also determine a remaining time of the media file by subtracting the played time from the total time of the media file, and include the remaining time in the request for the second portion of the media file. In other examples, wireless communication device 101 could additionally or alternatively determine the content received ratio of the media file by determining a remaining time ratio of remaining time to total time of the media file. In this case, the remaining time ratio would indicate a percentage of the total media file that remains in order for device 101 to complete the progressive download of the media file.

After determining the content received ratio of the media file, wireless communication device 101 transfers a request for a second portion of the media file for delivery to media gateway 140 over the second wireless network 130, wherein the request for the second portion of the media file includes the content received ratio of the media file (204). Typically, media gateway 140 is configured to determine the second portion of the media file requested by wireless communication device 101 based on the content received ratio provided by device 101 in the request. For example, if the content received ratio comprises the byte ratio of received bytes to total bytes of the media file, media gateway 140 could determine the second portion of the media file as the bytes of the file remaining after the initial percentage of the media file already received by device 101 according to the byte ratio. After transferring the request for the second portion of the media file, wireless communication device 101 receives the second portion of the media file transmitted from media gateway 140 over the second wireless network 130 via progressive download (205).

Advantageously, the operation of FIG. 2 facilitates progressive download of media content when a handoff from one wireless network 120 to another wireless network 130 occurs during the transfer, particularly when the wireless networks 120 and 130 are of different network types. For example, if wireless network 120 comprises a third generation (3G) wireless network and wireless network 130 comprises a fourth generation (4G) wireless network, a quality of the media file received by device 101 over wireless network 120 could be different from a corresponding quality of the media file available via wireless network 130. Thus, after wireless communication device 101 performs the handoff from wireless network 120 to wireless network 130, the media file available via network 130 could comprise a higher definition video file with greater total bytes than what was initially received by wireless communication device 101 via wireless network 120. However, since media gateway 140 could utilize the content received ratio to determine the second portion of the media file requested by device 101, the appropriate section of the media file can still be selected for transfer to wireless communication device 101. In this manner, a user of wireless communication device 101 will enjoy a seamless playback or display of the media file, even when a quality of the media file is different between the two wireless networks 120 and 130 used to receive the content.

Referring back to FIG. 1, wireless communication device 101 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus— including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access nodes 122 and 133.

Wireless access nodes 122 and 133 each comprise RF communication circuitry and an antenna. The RF communication circuitry typically includes an amplifier, filter, RF modulator, and signal processing circuitry. Wireless access nodes 122 and 133 may also comprise a router, server, memory device, software, processing circuitry, cabling, power supply, network communication interface, structural support, or some other communication apparatus. Wireless access nodes 122 and 133 could each comprise a base station, Internet access node, telephony service node, wireless data access point, or some other wireless communication system—including combinations thereof. Some examples of wireless access nodes 122 and 133 include a base transceiver station (BTS), base station controller (BSC), radio base station (RBS), Node B, enhanced Node B (eNode B), and others. Wireless network protocols that may be utilized by wireless access nodes 122 and 133 include CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof.

Wireless communication networks 120 and 130 comprise core networks of a wireless communication provider, and could include routers, gateways, telecommunication switches, servers, processing systems, or other communication equipment and systems for providing communication and data services. Wireless networks 120 and 130 could comprise wireless communication nodes, telephony switches, Internet routers, network gateways, computer systems, communication links, or some other type of communication equipment—including combinations thereof. Wireless networks 120 and 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Wireless networks 120 and 130 may be configured to communicate over metallic, wireless, or optical links. Wireless networks 120 and 130 may be configured to use time-division multiplexing (TDM), Internet Protocol (IP), Ethernet, optical networking, wireless protocols, communication signaling, or some other communication format—including combinations thereof. In some examples, wireless networks 120 and 130 includes further access nodes and associated equipment for providing communication services to many wireless communication devices across a large geographic region.

Media gateway 140 comprises a processing system and communication transceiver. Media gateway 140 may also include other components such as a router, server, data storage system, and power supply. Media gateway 140 may reside in a single device or may be distributed across multiple devices. Media gateway 140 may be a discrete system or may be integrated within other systems—including other systems within communication system 100. In some examples, media gateway 140 could comprise a network switch, mobile switching center, router, switching system, packet gateway, network gateway system, Internet access node, application server, service node, firewall, or some other communication system—including combinations thereof.

Media server 150 comprises a processing system and communication transceiver. Media server 150 may also include other components such as a router, server, data storage system, and power supply. Media server 150 may reside in a single device or may be distributed across multiple devices. Media server 150 may be a discrete system or may be integrated within other systems—including other systems within communication system 100. In some examples, media server 150 could comprise a web server, database, network switch, mobile switching center, router, switching system, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
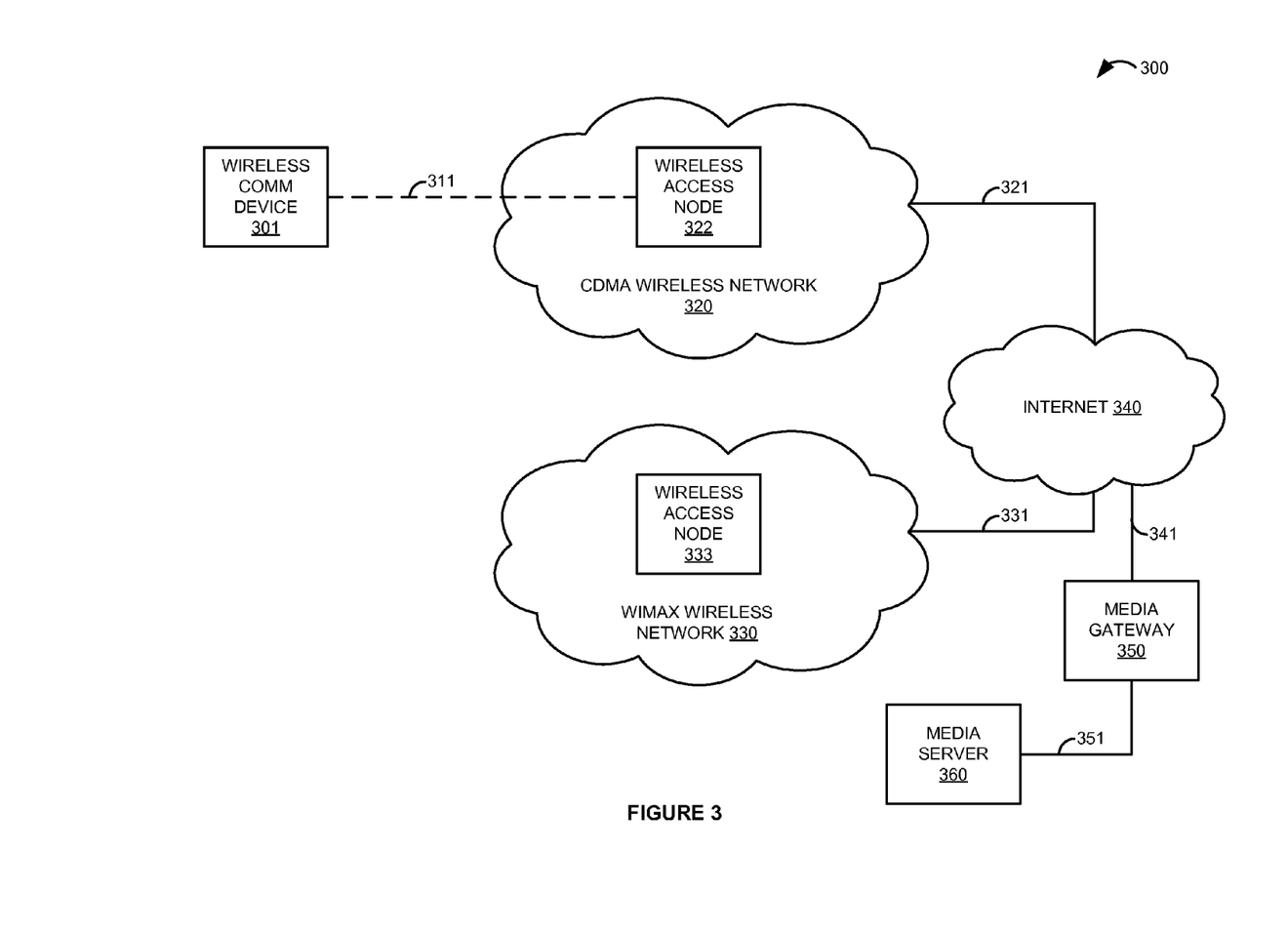
FIG. 3 is a block diagram that illustrates a communication system in an exemplary embodiment.

FIG. 3 is a block diagram that illustrates communication system 300. Communication system 300 includes wireless communication device 301, CDMA wireless network 320, WiMAX wireless network 330, internet 340, media gateway 350, and media server 360. CDMA wireless network 320 includes wireless access node 322, and WiMAX wireless network 330 includes wireless access node 333. As shown in FIG. 3, wireless communication device 301 and wireless access node 322 are presently in communication over wireless communication link 311, but device 301 and wireless access node 333 could communicate over a similar wireless link (not shown) depending on the location of wireless communication device 301 and other factors. Wireless access node 322 and internet 340 communicate over communication link 321, while wireless access node 333 and internet 340 are in communication over communication link 331. Internet 340 and media gateway 350 communicate over communication link 341. Media gateway 350 and media server 360 are in communication over communication link 351. Wireless communication device 301 comprises a dual-mode wireless communication device in this example, capable of communicating with both 3G CDMA wireless access network 320 and 4G WiMAX wireless access network 330.

Figure 4:
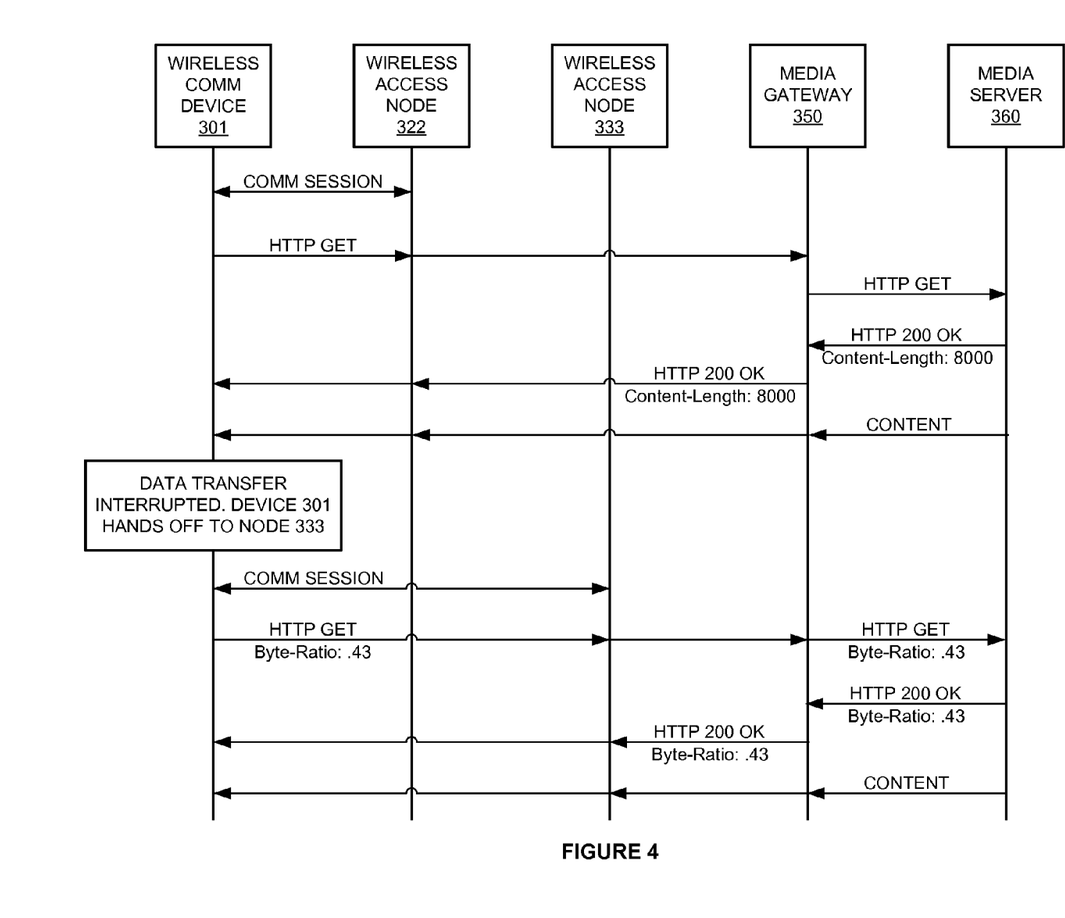
FIG. 4 is a sequence diagram that illustrates an operation of the communication system in an exemplary embodiment.

FIG. 4 is a sequence diagram that illustrates an operation of communication system 300 in an exemplary embodiment. The operation of FIG. 4 begins with wireless communication device 301 and wireless access node 322 establishing a communication session over wireless communication link 311. Once the communication session is established, wireless communication device 301 transmits a hypertext transfer protocol (HTTP) GET message for delivery to media gateway 350 via wireless access node 322.

The HTTP GET message requests an HTTP progressive download of a media file served by media server 360. Thus, media gateway 350 processes the request and forwards the HTTP GET message to media server 360 to retrieve the requested media file. Responsive to the HTTP GET message, media server 360 transfers an HTTP 200 OK message to media gateway 350 to indicate that the progressive download request of the media file is approved. Included in the HTTP 200 OK message is a Content-Length header that informs media gateway 350 of the size of the requested content. In this example, media server 360 includes a Content-Length header with a value of 8,000 to indicate that the media file requested has a size of 8,000 bytes. Media gateway 350 transfers the HTTP 200 OK message with the Content-Length header of 8,000 for delivery to wireless communication device 301 via wireless access node 322.

The requested media content is then transferred using HTTP progressive download from media server 360 to wireless communication device 301 via media gateway 350 and wireless access node 322. Therefore, when enough of the media file has been received by wireless communication device 301, device 301 begins playback of the media file for the immediate enjoyment of the user, before the media file has completely finished downloading. In this example, wireless communication device 301 receives an initial 3,440 bytes of the media file before device 301 hands off to wireless access node 333, resulting in an interruption of the data transfer.

Upon handing off to wireless access node 333 of 4G WiMAX wireless network 330, wireless communication device 301 and wireless access node 333 establish a communication session. At some point prior to, during, or after the handoff, wireless communication device 301 also calculates a byte ratio for the partially received media content by dividing the initial bytes received of 3,440 by the total 8,000 bytes of the file to determine a ratio of 0.43. Wireless communication device 301 then transfers another HTTP GET message for delivery to media gateway 350 via wireless access node 333 requesting the same media content as before, but this time includes a Byte-Ratio header with a value of 0.43 to indicate the first portion of the file that has already been received by device 301. The Byte-Ratio header could be a preexisting HTTP GET header that is modified to accommodate the Byte-Ratio data, or could be a newly defined HTTP GET header.

Media gateway 350 receives the HTTP GET message along with the included Byte-Ratio header and processes the request. Media gateway 350 then transfers the HTTP GET message with the Byte-Ratio to media server 360 to request the remaining portion of the media content. Media server 360 processes the request and responds to media gateway 350 with an HTTP 200 OK message that indicates approval for wireless communication device 301 to download the requested content from the point in the file specified by the Byte-Ratio. Media gateway 350 forwards the HTTP 200 OK message for delivery to wireless communication device 301 via wireless access node 333.

The requested media content starting at the Byte-Ratio included in the request is then transferred using HTTP progressive download from media server 360 to wireless communication device 301 via media gateway 350 and wireless access node 333. In this example, the requested media file is available in a larger, higher definition version from media server 360 when wireless communication device 301 is connected to the 4G WiMAX wireless network 330. For example, the high definition media file size could be 100,000 bytes via WiMAX wireless network 330 instead of the 8,000 byte size of the standard definition version partially obtained by wireless communication device 301 previously via CDMA wireless network 320. Therefore, media gateway 350 would determine that bytes 43,000 to bytes 100,000 of the high definition media file are requested by wireless communication device 301 based on the Byte-Ratio value of 0.43, and would request this portion of the high definition media file from media server 360. In this manner, the user of wireless communication device 301 would continue to view the requested media content after the handoff from 3G CDMA wireless network 320 to 4G WiMAX wireless network 330 with no gap in the playback of the content, albeit at a higher definition and possibly using a different media player on device 301 after the handoff to WiMAX network 330.

Figure 5:
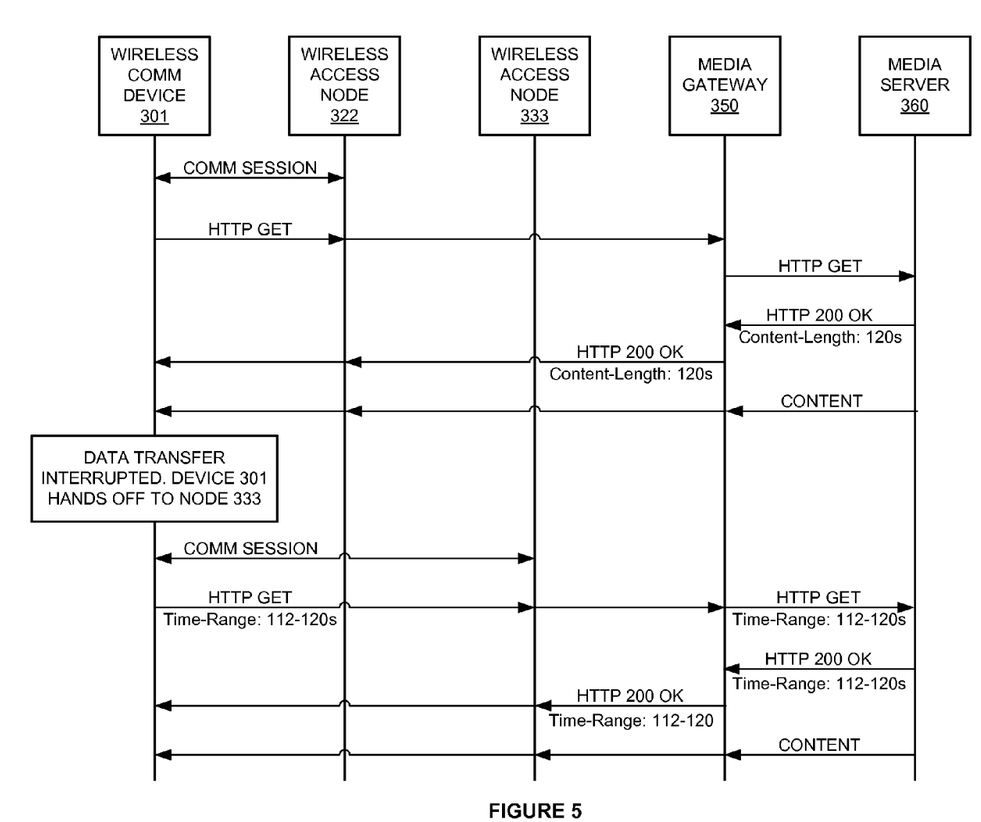
FIG. 5 is a sequence diagram that illustrates an operation of the communication system in an exemplary embodiment.

FIG. 5 is a sequence diagram that illustrates an operation of communication system 300 in an exemplary embodiment. The operation of FIG. 5 is similar to the operation shown in FIG. 4, except headers with different values related to playback time of the media content are included in the HTTP GET messages for the progressive download of media content from media server 360.

Once a communication session is established between wireless communication device 301 and wireless access node 322, wireless communication device 301 transmits an HTTP GET message for delivery to media gateway 350 via wireless access node 322. Media gateway 350 processes the request and forwards the HTTP GET message to media server 360 to retrieve the requested media file. In response to the HTTP GET message, media server 360 transfers an HTTP 200 OK message to media gateway 350 to indicate that the progressive download request of the media file is approved. Included in the HTTP 200 OK message is a Content-Length header that informs media gateway 350 of the length of the requested content. In this example, media server 360 includes a Content-Length header with a value of 120 seconds to indicate the total time duration of the requested media file. Media gateway 350 transfers the HTTP 200 OK message with the Content-Length header of 120 seconds for delivery to wireless communication device 301 via wireless access node 322.

The requested media content is then transferred using HTTP progressive download from media server 360 to wireless communication device 301 via media gateway 350 and wireless access node 322. In this example, wireless communication device 301 receives the first 112 seconds of the media file before device 301 hands off to wireless access node 333, resulting in an interruption of the data transfer.

Upon handing off to wireless access node 333 of 4G WiMAX wireless network 330, wireless communication device 301 and wireless access node 333 establish a communication session. Wireless communication device 301 then transfers another HTTP GET message for delivery to media gateway 350 via wireless access node 333 requesting the same media content as before, but this time includes a Time-Range header with a value of 112 to 120 seconds to indicate the second portion of the file needed by device 301 to complete the download. In this example, wireless communication device 301 determines that 112 seconds of the media file have been received based on a playback time indicated by a media player executing on wireless communication device 301 that is playing the content as it is received by device 301.

Media gateway 350 receives the HTTP GET message along with the included Time-Range header and processes the request. Media gateway 350 then transfers the HTTP GET message with the indicated Time-Range to media server 360 to request the remaining portion of the media content. Media server 360 processes the request and responds to media gateway 350 with an HTTP 200 OK message that indicates approval for wireless communication device 301 to download the requested content for the specified Time-Range. Media gateway 350 forwards the HTTP 200 OK message for delivery to wireless communication device 301 via wireless access node 333.

The requested media content spanning the Time-Range value included in the request is then transferred using HTTP progressive download from media server 360 to wireless communication device 301 via media gateway 350 and wireless access node 333. Advantageously, the user of wireless communication device 301 would continue to enjoy the requested media content after the handoff from CDMA wireless network 320 to WiMAX wireless network 330 with seamless playback of the content after the handoff to WiMAX network 330, even if the file received via WiMAX network 330 has a different quality, resolution, bitrate, aspect ratio, frame rate, data rate, file size, codec, or some other attribute than the first portion initially received via CDMA network 320. In addition, if wireless communication device 301 performed a handoff back to CDMA wireless network 320 before completing the download, device 301 could request and receive a third portion of the media content in a similar manner as described above.

Figure 6:
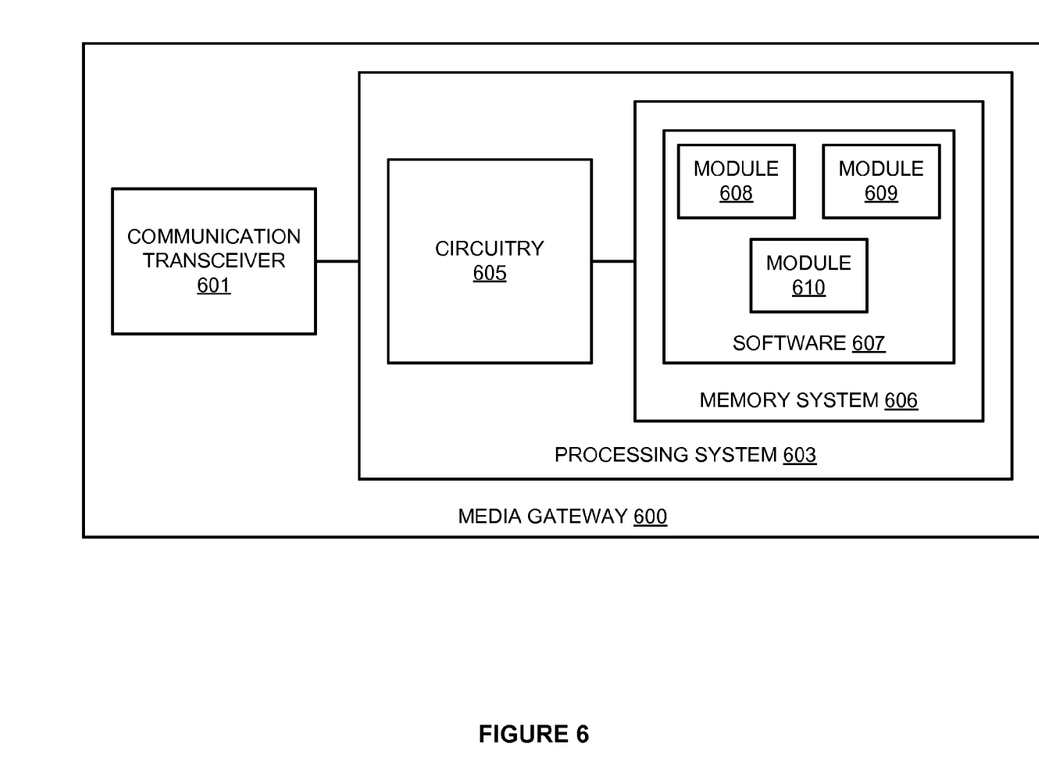
FIG. 6 is a block diagram that illustrates a handoff determination system.

FIG. 6 is a block diagram that illustrates media gateway 600. Media gateway 600 provides an example of media gateway 140, although gateway 140 may use alternative configurations. Media gateway 600 comprises communication transceiver 601 and processing system 603. Processing system 603 is linked to communication transceiver 601. Processing system 603 includes processing circuitry 605 and memory system 606 that stores operating software 607. Operating software 607 comprises software modules 608-610.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. Communication transceiver 601 could be configured to transmit a first portion of a media file for delivery to a wireless communication device over a first wireless network via progressive download, receive a request for a second portion of the media file over the second wireless network, wherein the request for the second portion of the media file includes a content received ratio of the media file, and transmit the second portion of the media file for delivery to the wireless communication device over the second wireless network via progressive download.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-610, although software 607 could have alternative configurations in some examples.

When executed by circuitry 605, operating software 607 directs processing system 603 to operate as described herein for media gateway 140. In particular, operating software 607 may direct processing system 603 to direct communication transceiver 601 to transmit a first portion of a media file for delivery to a wireless communication device over a first wireless network via progressive download. Further, operating software 607 may direct processing system 603 to direct communication transceiver 601 to receive a request for a second portion of the media file over the second wireless network, wherein the request for the second portion of the media file includes a content received ratio of the media file. In addition, operating software 607 may direct processing system 603 to direct communication transceiver 601 to transmit the second portion of the media file for delivery to the wireless communication device over the second wireless network via progressive download. In some examples, operating software 607 may direct processing system 603 to determine the second portion of the media file based on the content received ratio of the media file included in the request for the second portion of the media file.

In this example, operating software 607 comprises a first content transfer software module 608 that transmits a first portion of a media file for delivery to a wireless communication device over a first wireless network via progressive download. Additionally, operating software 607 comprises a request receiver software module 609 that receives a request for a second portion of the media file over the second wireless network, wherein the request for the second portion of the media file includes a content received ratio of the media file. Operating software 607 also comprises a second content transfer software module 610 that transmits the second portion of the media file for delivery to the wireless communication device over the second wireless network via progressive download.

Figure 7:
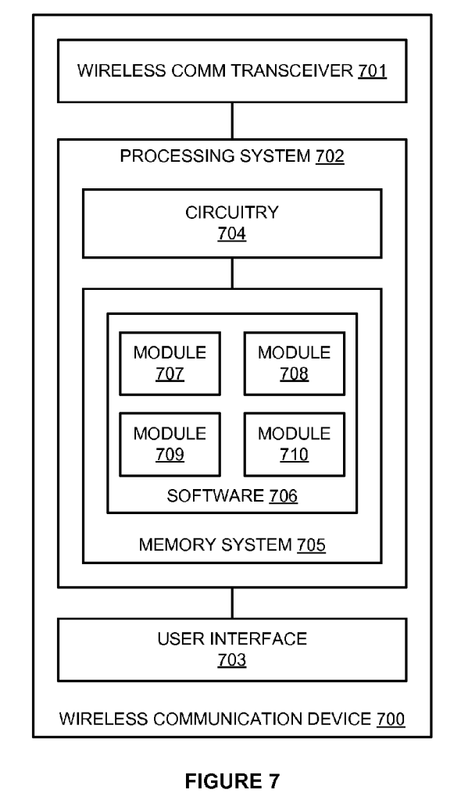
FIG. 7 is a block diagram that illustrates a wireless communication device.

FIG. 7 is a block diagram that illustrates wireless communication device 700. Wireless communication device 700 provides an example of wireless communication device 101, although device 101 could use alternative configurations. Wireless communication device 700 comprises wireless communication transceiver 701, processing system 702, and user interface 703. Processing system 702 is linked to wireless communication transceiver 701 and user interface 703. Processing system 702 includes processing circuitry 704 and memory system 705 that stores operating software 706. Operating software 706 comprises software modules 707-710. Wireless communication device 700 may include other well-known components such as a battery and enclosure that are not shown for clarity. Wireless communication device 700 may comprise a telephone, computer, e-book, mobile Internet appliance, media player, game console, wireless network interface card, or some other wireless communication apparatus—including combinations thereof.

Wireless communication transceiver 701 comprises RF communication circuitry and an antenna. The RF communication circuitry typically includes an amplifier, filter, RF modulator, and signal processing circuitry. Wireless communication transceiver 701 may also include a memory system, software, processing circuitry, or some other communication device. Wireless communication transceiver 701 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication transceiver 701 is configured to receive a first portion of a media file transmitted from a media gateway over a first wireless network via progressive download, and perform a handoff to a second wireless network. Wireless communication transceiver 701 is also configured to transfer a request for a second portion of the media file for delivery to the media gateway over the second wireless network, wherein the request for the second portion of the media file includes a content received ratio of the media file, and receive the second portion of the media file transmitted from the media gateway over the second wireless network via progressive download.

User interface 703 comprises components that interact with a user to receive user inputs and to present media and/or information. User interface 703 may include a speaker, microphone, buttons, lights, display screen, touch screen, touch pad, scroll wheel, communication port, or some other user input/output apparatus—including combinations thereof. User interface 703 may be omitted in some examples.

Processing circuitry 704 comprises microprocessor and other circuitry that retrieves and executes operating software 706 from memory system 705. Processing circuitry 704 may comprise a single device or could be distributed across multiple devices—including devices in different geographic areas. Processing circuitry 704 may be embedded in various types of equipment. Memory system 705 comprises a non-transitory computer readable storage medium, such as a disk drive, flash drive, data storage circuitry, or some other hardware memory apparatus. Memory system 705 may comprise a single device or could be distributed across multiple devices—including devices in different geographic areas. Memory system 705 may be embedded in various types of equipment. Processing circuitry 704 is typically mounted on a circuit board that may also hold memory system 705 and portions of communication transceiver 701 and user interface 703. Operating software 706 comprises computer programs, firmware, or some other form of machine-readable processing instructions. Operating software 706 may include an operating system, utilities, drivers, network interfaces, applications, or some other type of software. In this example, operating software 706 comprises software modules 707-710, although software 706 could have alternative configurations in some examples.

When executed by processing circuitry 704, operating software 706 directs processing system 702 to operate wireless communication device 700 as described herein for wireless communication device 101. In particular, operating software 706 directs processing system 702 to direct wireless communication transceiver 701 to receive a first portion of a media file transmitted from a media gateway over a first wireless network via progressive download, and to perform a handoff to a second wireless network. Further, operating software 706 directs processing system 702 to determine a content received ratio of the media file that indicates the first portion of the media file received by the wireless communication device, and generate a request for a second portion of the media file. In addition, operating software 706 directs processing system 702 to direct wireless communication transceiver 701 to transfer the request for the second portion of the media file for delivery to the media gateway over the second wireless network, wherein the request for the second portion of the media file includes the content received ratio of the media file, and to receive the second portion of the media file transmitted from the media gateway over the second wireless network via progressive download.

In this example, operating software 706 comprises a content receiver software module 707 that receives a first portion of a media file transmitted from a media gateway over a first wireless network via progressive download, and receives a second portion of the media file transmitted from the media gateway over a second wireless network via progressive download. Additionally, operating software 706 comprises a handoff software module 708 that performs a handoff to the second wireless network. Operating software 706 also comprises a ratio determination software module 709 that determines a content received ratio of the media file that indicates the first portion of the media file received by the wireless communication device, and generates a request for a second portion of the media file. Further, operating software 706 comprises a request transfer software module 710 that transfers the request for the second portion of the media file for delivery to the media gateway over the second wireless network, wherein the request for the second portion of the media file includes the content received ratio of the media file.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device to facilitate progressive download of media content, the method comprising:
   receiving a first portion of a media file in a first format transmitted from a media gateway over a first wireless network via progressive download;
   performing a handoff to a second wireless network;
   determining a content received ratio of the media file in the first format that indicates the first portion of the media file in the first format received by the wireless communication device;
   transferring a request for a second portion of the media file in a second format for delivery to the media gateway over the second wireless network, wherein the request for the second portion of the media file in the second format includes the content received ratio of the media file in the first format and wherein the second format of the media file comprises a different number of bytes than the first format of the media file; and receiving the second portion of the media file in the second format transmitted from the media gateway over the second wireless network via progressive download.

2. The method of claim 1 wherein determining the content received ratio of the media file in the first format comprises determining a byte ratio of received bytes to total bytes of the media file in the first format.

3. The method of claim 1 wherein determining the content received ratio of the media file in the first format comprises determining a remaining bytes ratio of remaining bytes to total bytes of the media file in the first format.

4. The method of claim 1 wherein determining the content received ratio of the media file in the first format comprises determining a time ratio of played time to total time of the media file in the first format.

5. The method of claim 4 wherein determining the time ratio of the played time to the total time of the media file in the first format comprises determining the played time and the total time from a media player configured to play the media file in the first format on the wireless communication device.

6. The method of claim 4 further comprising determining a remaining time of the media file in the first format by subtracting the played time from the total time of the media file in the first format, and including the remaining time in the request for the second portion of the media file in the second format.

7. The method of claim 1 wherein determining the content received ratio of the media file in the first format comprises determining a remaining time ratio of remaining time to total time of the media file in the first format.

8. The method of claim 1 wherein the media gateway is configured to determine the second portion of the media file in the second format based on the content received ratio of the media file in the first format included in the request for the second portion of the media file in the second format.

9. The method of claim 1 wherein the first wireless network comprises a third generation (3G) wireless network and the second wireless network comprises a fourth generation (4G) wireless network.

10. The method of claim 1 wherein performing the handoff to the second wireless network comprises performing a hard handoff to the second wireless network, and wherein the first wireless network and the second wireless network are different network types.

11. A wireless communication device comprising:
a wireless communication transceiver configured to receive a first portion of a media file in a first format transmitted from a media gateway over a first wireless network via progressive download, and perform a handoff to a second wireless network;
a processing system configured to determine a content received ratio of the media file in the first format that indicates the first portion of the media file in the first format received by the wireless communication device, and generate a request for a second portion of the media file in a second format; and
the wireless communication transceiver configured to transfer the request for the second portion of the media file in the second format for delivery to the media gateway over the second wireless network, wherein the request for the second portion of the media file in the second format includes the content received ratio of the media file in the first format and wherein the second format of the media file comprises a different number of bytes than the first format of the media file, and receive the second portion of the media file in the second format transmitted from the media gateway over the second wireless network via progressive download.

12. The wireless communication device of claim 11 wherein the processing system configured to determine the content received ratio of the media file in the first format comprises the processing system configured to determine a byte ratio of received bytes to total bytes of the media file in the first format.

13. The wireless communication device of claim 11 wherein the processing system configured to determine the content received ratio of the media file in the first format comprises the processing system configured to determine a remaining bytes ratio of remaining bytes to total bytes of the media file in the first format.

14. The wireless communication device of claim 11 wherein the processing system configured to determine the content received ratio of the media file in the first format comprises the processing system configured to determine a time ratio of played time to total time of the media file in the first format.

15. The wireless communication device of claim 14 wherein the processing system configured to determine the time ratio of the played time to the total time of the media file in the first format comprises the processing system configured to determine the played time and the total time from a media player configured to play the media file in the first format on the wireless communication device.

16. The wireless communication device of claim 14 further comprising the processing system configured to determine a remaining time of the media file in the first format by subtracting the played time from the total time of the media file in the first format, and to include the remaining time in the request for the second portion of the media file in the second format.

17. The wireless communication device of claim 11 wherein the processing system configured to determine the content received ratio of the media file in the first format comprises the processing system configured to determine a remaining time ratio of remaining time to total time of the media file in the first format.

18. The wireless communication device of claim 11 wherein the media gateway is configured to determine the second portion of the media file in the second format based on the content received ratio of the media file in the first format included in the request for the second portion of the media file in the second format.

19. The wireless communication device of claim 11 wherein the first wireless network comprises a third generation (3G) wireless network and the second wireless network comprises a fourth generation (4G) wireless network.

20. A communication system to facilitate progressive download of media content, the system comprising:
a wireless communication device configured to receive a first portion of a media file in a first format transmitted from a media gateway over a first wireless network via progressive download, perform a handoff to a second wireless network, determine a content received ratio of the media file in the first format that indicates the first portion of the media file in the first format received by the wireless communication device, and transfer a request for a second portion of the media file in a second format for delivery to the media gateway over the second wireless network, wherein the request for the second portion of the media file in the second format includes the content received ratio of the media file in the first format and wherein the second format of the media file comprises a different number of bytes than the first format of the media file;

the media gateway configured to determine the second portion of the media file in the second format based on the content received ratio of the media file in the first format included in the request for the second portion of the media file in the second format, and transfer the second portion of the media file in the second format for delivery to the wireless communication device; and the wireless communication device configured to receive the second portion of the media file in the second format transmitted from the media gateway over the second wireless network via progressive download.

\* \* \* \* \*